United States Patent
Apaydin et al.

(10) Patent No.: US 12,341,259 B2
(45) Date of Patent: Jun. 24, 2025

(54) LOW BAND ANTENNA ARCHITECTURE WITH APERTURE AND IMPEDANCE TUNING

(71) Applicant: Meta Platforms Technologies, LLC, Menlo Park, CA (US)

(72) Inventors: Nil Apaydin, Kirkland, WA (US); Fengyu Ge, Monroe, WA (US); Gordon Michael Coutts, Woodinville, WA (US); Liang Han, Sunnyvale, CA (US)

(73) Assignee: Meta Platforms Technologies, LLC

( * ) Notice: Subject to any disclaimer, the term of this patent is extended or adjusted under 35 U.S.C. 154(b) by 213 days.

(21) Appl. No.: 17/868,524

(22) Filed: Jul. 19, 2022

(65) Prior Publication Data
US 2024/0030603 A1    Jan. 25, 2024

(51) Int. Cl.
*H01Q 1/27* (2006.01)
*H01Q 5/335* (2015.01)

(52) U.S. Cl.
CPC ............ *H01Q 5/335* (2015.01); *H01Q 1/273* (2013.01)

(58) Field of Classification Search
CPC .......... H01Q 5/335; H01Q 1/273; H01Q 1/12; H01Q 1/521; H01Q 5/20; H01Q 5/30; H01Q 23/00; H04B 1/385; H04B 17/102; H04B 1/40
See application file for complete search history.

(56) References Cited

U.S. PATENT DOCUMENTS

| | | | | |
|---|---|---|---|---|
| 10,903,553 | B2* | 1/2021 | Wang | H04B 1/385 |
| 2016/0126619 | A1* | 5/2016 | Tenbroek | H01Q 9/0442 |
| | | | | 343/745 |
| 2016/0204820 | A1* | 7/2016 | Mow | H04B 1/40 |
| | | | | 455/575.7 |
| 2019/0027821 | A1* | 1/2019 | Judkins | H01Q 1/521 |
| 2019/0363428 | A1* | 11/2019 | Zhu | H01Q 9/0457 |
| 2020/0006842 | A1* | 1/2020 | Zhu | H01Q 1/241 |
| 2020/0177226 | A1* | 6/2020 | Cha | H04B 1/406 |
| 2023/0282962 | A1* | 9/2023 | Wei | G04G 17/04 |
| | | | | 343/700 R |
| 2023/0282965 | A1* | 9/2023 | Wei | H01Q 13/10 |
| | | | | 343/718 |

FOREIGN PATENT DOCUMENTS

EP        3016289 B1      9/2018

OTHER PUBLICATIONS

European Search Report for European Patent Application No. 23185852.3 dated Nov. 30, 2023, 06 pages.

* cited by examiner

*Primary Examiner* — Hai V Tran
*Assistant Examiner* — Michael M Bouizza
(74) *Attorney, Agent, or Firm* — FOLEY & LARDNER LLP

(57) ABSTRACT

The disclosed system may include an antenna and an antenna matching network. The antenna matching network may include an aperture tuner configured to shift a frequency response of the antenna and an impedance tuner configured to dynamically change an amount of radiated power for the antenna. The antenna matching network may be positioned at least a specified minimum distance from the antenna according to various operating characteristics of the antenna. Various other apparatuses, wearable electronic devices, and methods of manufacturing are also disclosed.

20 Claims, 15 Drawing Sheets

LOW BAND ANTENNA ARCHITECTURE WITH APERTURE AND IMPEDANCE TUNING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
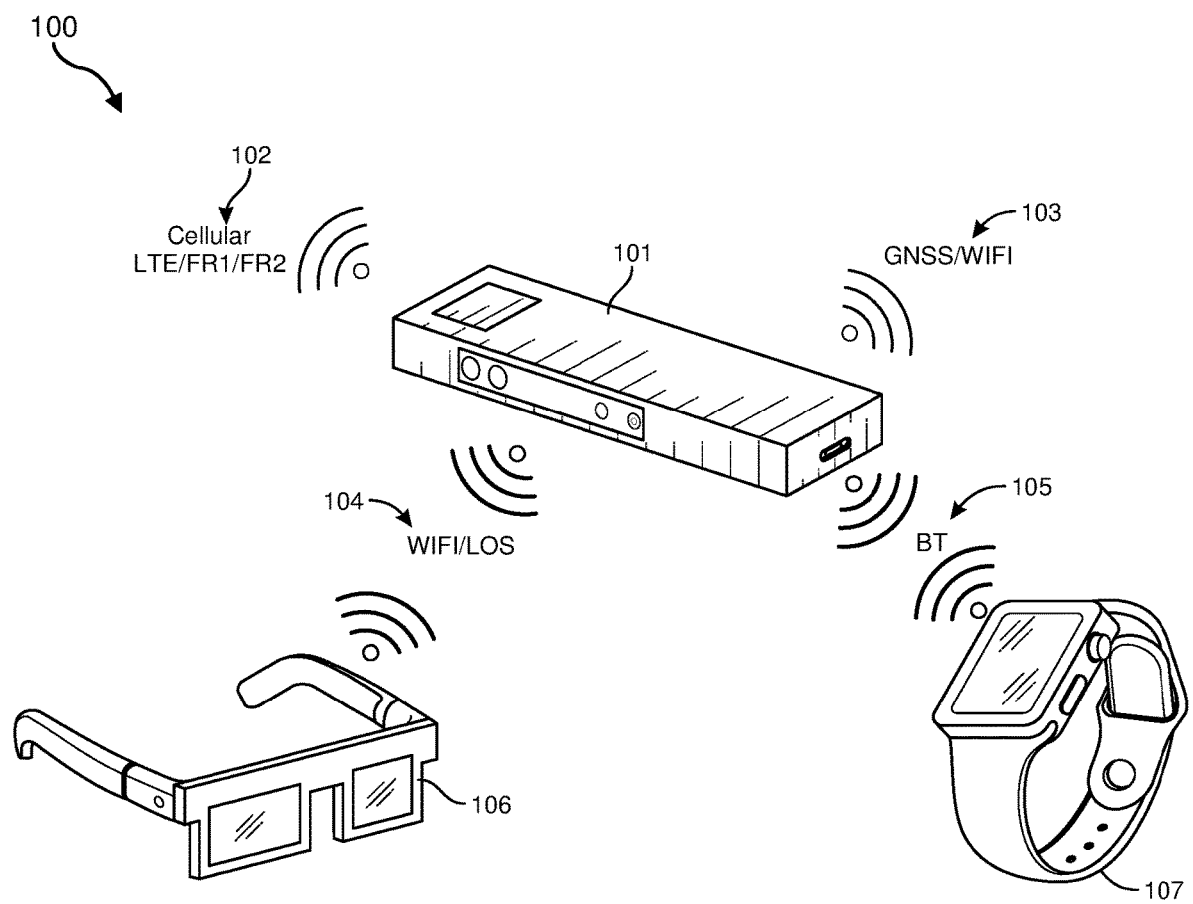
FIG. 1 illustrates an embodiment of a mobile electronic device establishing and implementing different communication links between the mobile electronic device and other electronic devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to various antenna tuner topologies along with procedures for determining which type of antenna tuners to use to reach different antenna efficiency standards. In some cases, wireless electronic devices may use aperture tuning and/or impedance tuning to change the operating characteristics of antennas. Changing the operating characteristics of the antennas may allow the same antenna, for example, to operate in multiple different frequency bands. In some cases, however, these tuners may cause resonances or may reduce the efficiency of nearby antennas. These reductions in antenna efficiency may be particularly noticeable on small form factor, mobile electronic devices.

The embodiments described herein provide systems and methods for selecting the best type of tuners to use in each device. These systems may also determine optimal placements for those tuners along the length of each antenna. As different antennas may have different target efficiencies, each antenna may be separately tuned using different aperture and/or impedance tuners. Placement of the tuners on the antennas may also be determined for certain target efficiencies. As used herein, "antenna efficiency" may refer to a measure of how efficiently power coming from a corresponding radio may be radiated out from the antenna. Antenna tuning and matching may be implemented to change this antenna efficiency. The process of selecting tuners may include, for example, analyzing the underlying antenna architecture of a wireless device to determine an optimal location for a tuner, determining which kind of tuner to use based on different capacitance, resistance, or impedance characteristics of the wireless device, and placing the selected tuner in an optimal location relative to the antennas or other RF components in the wireless device.

The embodiments described herein may include different tuner topologies that incorporate different types of tuners, terminating connections, and/or tuner placements relative to the antennas. These embodiments may also include the overall process used for determining which types of tuner topologies to use and where to place those tuner topologies based on the position of neighboring low-band antennas, high-band antennas, and other electronic components within the wireless electronic device.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment 100 of a mobile electronic device. The mobile electronic device 101 may be designed to operate in conjunction with other mobile or stationary electronic devices. These electronic devices may include smartphones, smartwatches, virtual reality (VR) head-mounted displays (HMDs), augmented reality glasses, laptops, tablets, personal computers, internet of things (IoT) devices (e.g., smart doorbells, refrigerators, coffee makers), or any other electronic devices that are capable of wired or wireless communication. The mobile electronic device 101 may include different types of antennas to communicate on intralinks (e.g., wireless communications between local devices) or on interlinks (e.g., wireless communications between remote devices including wireless connections to the internet). In some cases, the mobile electronic device 101 may include processors, controllers, or other processing means to perform at least some amount of distributed processing for the local devices that are connected via intralinks.

For example, the mobile electronic device 101 may provide processing capabilities for connected VR HMDs or artificial reality devices (e.g., augmented reality glasses) or smartwatches. In such cases, the HMDs, glasses, or smartwatches may turn over processing tasks to the mobile electronic device 101 where those tasks will be processed. Upon completion of the tasks, the mobile electronic device 101 may then return the processed results to the local devices. In this manner, the mobile electronic device 101 may communicate with local electronic devices, perform processing for those devices, and return the results of the processing to those devices. Moreover, the mobile electronic device 101 may connect to cellular, global navigation satellite system (GNSS), or other remote computer networks to retrieve information and pass that information to the local devices. In this manner, the mobile electronic device 101 may function as a processing and/or communications hub for these local electronic devices.

In some cases, the local electronic devices may include artificial reality devices. These artificial reality devices may, themselves, include many different types of electronic hardware. In some cases, for example, artificial reality devices may include head-mounted displays that provide a virtual reality environment or augmented reality glasses that provide an augmented reality environment. In such cases, these HMDs may fully cover the user's eyes, and the user may be entirely enveloped in the virtual environment. In other cases, artificial reality devices may include augmented reality glasses or other similar devices. In such cases, the augmented reality glasses may allow the user to still see the world around them, but may project virtual objects into the physical world. As such, the wearer of the augmented reality glasses may see real world objects as well as virtual objects that are projected onto the user's eyes by the augmented reality glasses. Smartphones, smartwatches, and other mobile electronic devices may be used in conjunction with these artificial reality devices and/or with the mobile electronic device 101.

As noted above, the mobile electronic device 101 may include many types of antennas, sensors, and other electronic components. These antennas may include WiFi antennas, Bluetooth antennas, global navigation satellite system (GNSS) or global positioning system (GPS) antennas, cellular antennas (e.g., 5G, 6G, 7G, etc.), Ultrawideband (UWB) antennas, near-field communication (NFC) antennas, or other types of antennas. The mobile electronic device 101 may also include microphones, speakers, batteries, cameras, printed circuit boards (PCBs), touch sensors, buttons, insulating or heat conducting materials for thermal management, simultaneous location and mapping (SLAM) sensors, or other components.

In embodiment 100 of FIG. 1, the mobile electronic device 101 may be in communication with other local or remote electronic devices. As shown in FIG. 1, the mobile electronic device 101 may communicate with many different types of devices on many different types of antennas or radios. These radios may establish intralinks and interlinks. As the terms are used herein, "intralinks" may refer to wireless communication links between local devices that are within a few hundred feet of the mobile electronic device 101. The term "interlinks" may refer to wireless communication links between remote devices that may be any distance from the mobile electronic device 101, including anywhere in the world or space (e.g., links to satellites). Interlinks may be established using cellular radios 102 (e.g., long term evolution (LTE), 5G, 6G, 7G, etc.), FR1 frequency radios (e.g., 617 MHz-7.125 GHz, see 501 of FIG. 5A), FR2 frequency radios (e.g., 24.25-52.66 GHz, see 502 of FIG. 5B), GNSS radios 103, WiFi radios or other similar communications devices. Intralinks may be established using WiFi or line of sight (LOS) radios (e.g., 60 GHz radios) 104, Bluetooth radios 105 (e.g., to a pair of artificial reality glasses 106 or to a smartwatch 107, etc.), near-field communication (NFC) radios, or other antennas designed to operate over relatively short distances (e.g., within 1-300 feet).

In some examples, the mobile electronic device 101 may be configured to establish an intralink between itself and a pair of artificial reality glasses 106. The intralink may be established over a WiFi radio, over a Bluetooth radio, over an NFC radio, or over a LOS connection. In the case of the line-of-sight intralink connection 104, the antenna may be designed to operate at ultra-high frequencies, including 60 GHz or in the range of 53-60+GHz. Such antennas may experience a high degree of directionality and, as such, may operate most efficiently when the LOS antennas have a direct line of sight to the local electronic device. Thus, in FIG. 1, the mobile electronic device 101 may establish a direct, line-of-sight intralink connection 104 between itself and the artificial reality glasses 106. This line-of-sight intralink connection 104 may provide a relatively large amount of bandwidth for communication between the devices 101 and 106.

Still further, the mobile electronic device 101 may establish an intralink connection to a smartwatch 107. The smartwatch 107 may be any kind of smartwatch that is capable of wireless communication. In some cases, the mobile electronic device 101 may establish an intralink between itself and the smartwatch 107 using a Bluetooth connection, an NFC connection, or other type of local wireless connection. In some cases, the smartwatch 107 may run applications that use data provided through the mobile electronic device 101. In some embodiments, the mobile electronic device 101 may provide processing resources for the smartwatch 107, or may provide navigational instructions, or may connect cellular phone calls, or perform other functions in conjunction with the smartwatch 107.

Additionally or alternatively, the mobile electronic device 101 may be implemented to establish an intralink connection to internet of things (loT) devices such as a smart doorbell, a microwave oven, a refrigerator, a coffee maker, an interior/exterior lighting system, or other loT devices. The mobile electronic device 101 may also establish intralink and/or interlink communication with a smartphone. In such cases, the mobile electronic device 101 may provide processing resources including CPU cycles, RAM, and/or data storage for the smartphone. Still further, the mobile electronic device 101 may provide communication capabilities for the smartphone.

For instance, if the smartphone is incapable of making a cellular connection, the smartphone may connect locally using an intralink to the mobile electronic device 101, and may use the mobile electronic device's interlink connections to communicate with remote devices. At least in some cases, each of these wireless connections may be established using different types of radios including WiFi, Bluetooth, NFC, LOS, or other radios. Thus, the mobile electronic device 101 may be simultaneously communicating with multiple different local and/or remote devices using multiple different types of radios. Accordingly, the mobile electronic device 101 may be designed to allow some or all of these radios to operate simultaneously to allow for synchronous communication with many different local and remote devices. At least some of these designs are illustrated in FIGS. 2A-2C.

Figure 2A:
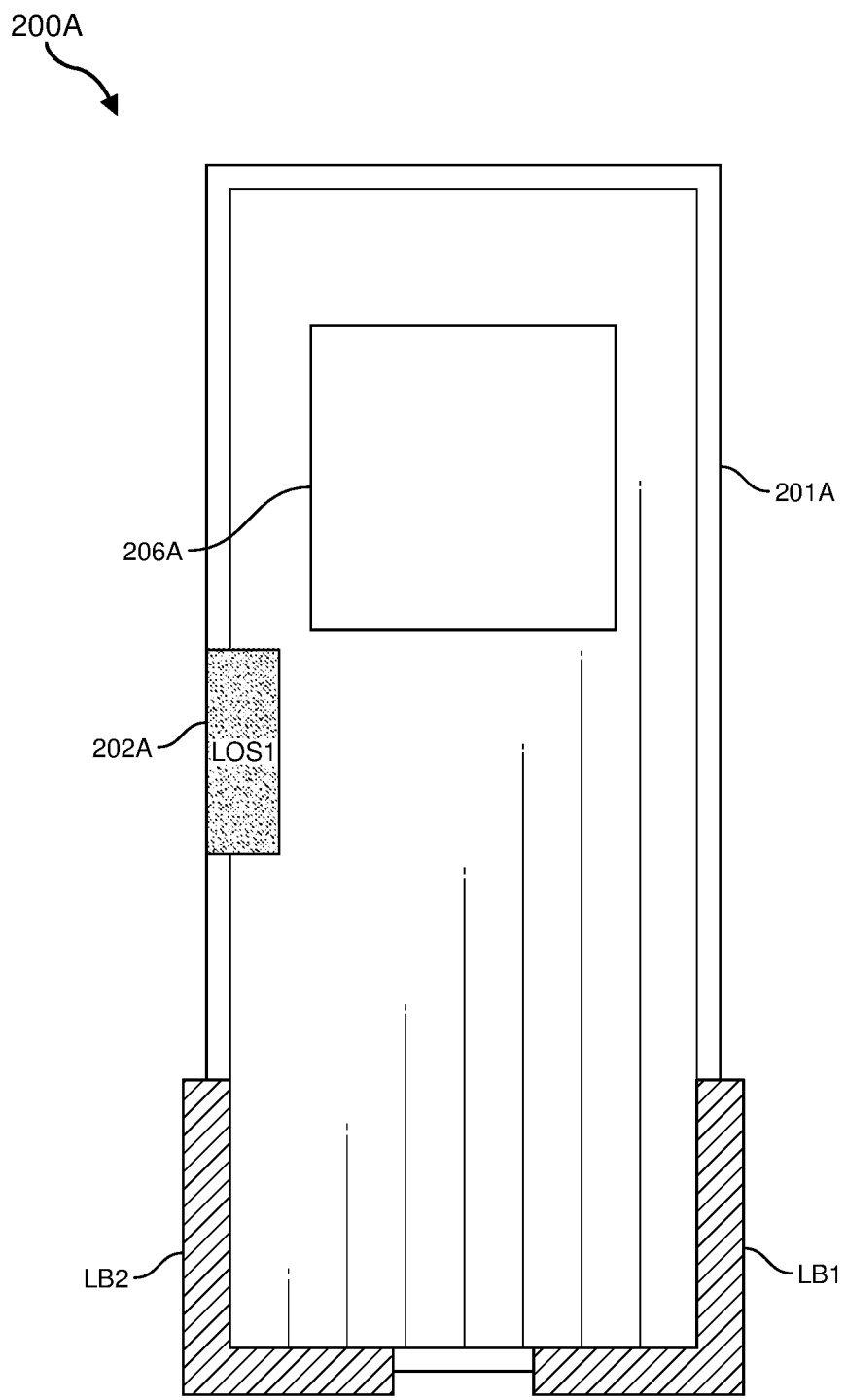
FIGS. 2A-2C illustrate embodiments of a mobile electronic device including placements of various electronic components.

FIG. 2A, for example, includes multiple different antennas including a first low band (LB) antenna LB1 and a second low band antenna LB2. In some embodiments, the two low band antennas may be placed on the same end of the mobile electronic device 200A or, in other cases, may be placed on different ends of the device. In the illustrated embodiment of FIG. 2A, the low band antennas LB1 and LB2 are positioned on opposite sides of the bottom end of the mobile electronic device 200A. By positioning the low band antennas on opposite sides and at a minimum offset angle with respect to each other, each of these antennas may maintain sufficient isolation for efficient operation. As used herein, the term "low band" may refer to frequencies in the range of 0.6-1.0 GHz. These low band antennas may include cellular antennas designed to create interlinks to external, remote communications networks within the frequency range of approximately 0.6-1.0 GHz. In some cases, two low band antennas may be implemented, while in other cases, more or fewer low band antennas may be used. Each of these antennas may be internally or externally mounted to the body or support structure 201A.

Additionally or alternatively, the mobile electronic device 200A may include at least one line-of-sight (LOS) antenna 202A. The LOS1 antenna may be placed on the front face of the mobile electronic device 200A when viewed in landscape mode, and may be placed on the left side of the mobile electronic device 200A when viewed in portrait mode. The LOS1 antenna may be enclosed plastic or other RF transparent material that will not attenuate or distort its radiation pattern. The LOS1 antenna may operate at or close to 60 GHz (e.g., within 100 MHz). When placed horizontally on a flat surface, such as when conducting augmented phone calls, for example, the LOS1 antenna may communicate directly with a VR headset or with a pair of augmented reality glasses. In some cases, the button or touchpad 206A may be implemented to interact with applications run by the mobile electronic device 200A including augmented calling applications.

Figure 2B:
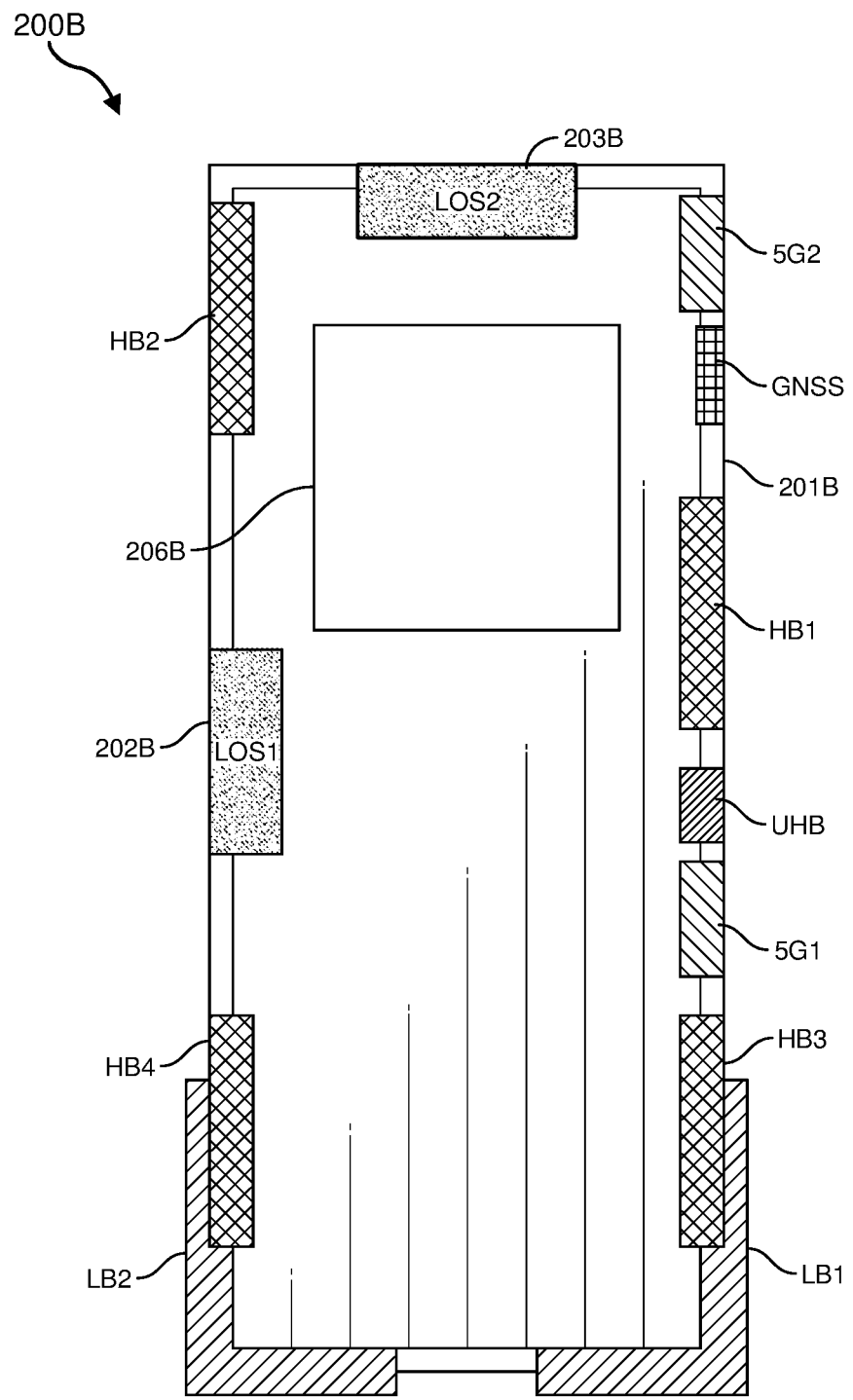
Figure 2C:
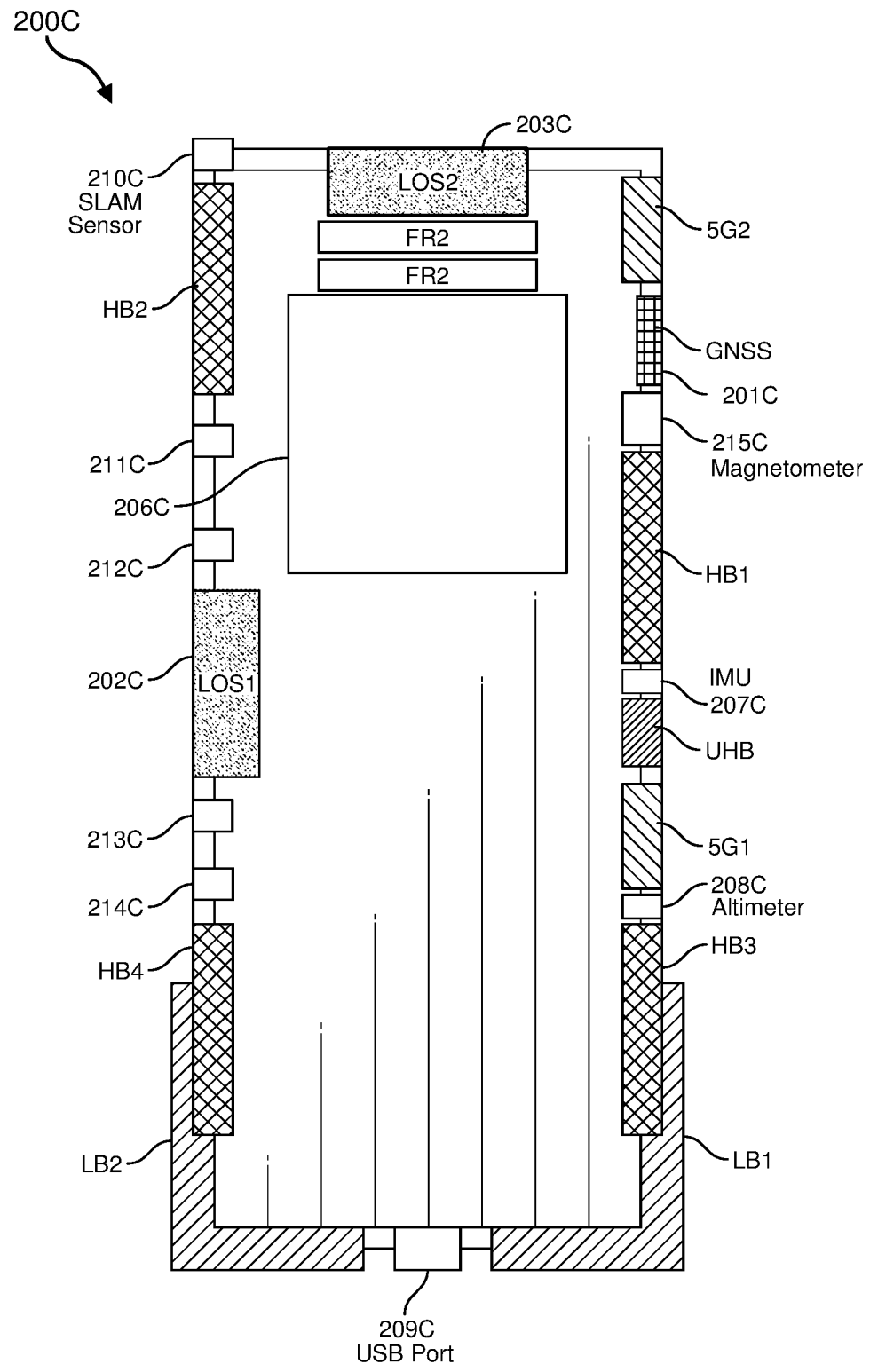

Still further, at least in some cases and as shown in FIG. 2B, the mobile electronic device 200B may include a secondary or alternative LOS antenna (e.g., LOS2 (203B)). LOS2 may also operate at or near 60 GHz. When used vertically, such as when playing games and holding the mobile electronic device 200B as a controller, the LOS2 antenna may communicate directly with a gaming system, with a smartphone, or with another local device using a line-of-sight 60 GHz connection. The LB1 and LB2 antennas may be placed away from the LOS1 and LOS2 antennas so as to provide sufficient isolation for each antenna. Moreover, this additional space between the LOS1 and LOS2 antennas and the LB1/LB2 antennas may allow space for thermally protective material, space for sensors, space for cameras, or other components. In some embodiments, for example, the LOS1 antenna (202B) may have cameras and/or other sensors positioned on either side of it. In FIG. 2B, the touchpad 206B is illustrated as being positioned between the LOS1 and LOS2 antennas. However, in some cases, the touchpad 206B may be moved to alternate positions, including on the bottom end of the support structure 201B.

In FIG. 2B, the various antennas may be positioned to allow isolation between each different type of antenna. For instance, the mobile electronic device 200B may include line-of-sight antennas LOS1 (202B) and LOS2 (203B). Additionally or alternatively, the mobile electronic device 200C may include high band antennas HB1, HB2, HB3, and/or HB4. As used herein, "high band" antennas may refer to antennas that operate in the medium-high band (MHB) and ultra-high band (UHB) ranges of 1.75 GHz-2.75 GHz and 3.3 GHz-4.2 GHz, respectively. Such high band antennas may include cellular antennas, Bluetooth antennas, WiFi antennas, or other types of antennas designed to operate in the high band frequency range. These high band antennas HB1-HB4 may be positioned on four opposite parts of the device's support structure 201B. While four high band antennas are used herein, it will be understood that more or fewer high band antennas may be used.

In FIG. 2B, the HB2 antenna may be placed in the upper left corner between the LOS1 and LOS2 antennas and to the left of the touchpad 206B. In some cases, the touchpad 206C or other components may provide separation between the high band antennas, leading to greater isolation and more efficient operation. The high band antenna HB1 may be on the upper right side of the mobile electronic device 200B and may be separated from HB2, HB3, and/or HB4 by at least a specified minimum distance. This minimum distance may allow each high band antenna to generate spherical or directional radiation coverage to transmit and receive data. In this embodiment, the HB3 and HB4 antennas may be placed close to or immediately next to the LB1 and LB2 antennas. Because the HB3/HB4 and LB1/LB2 antennas operate on different frequencies, the amount of interference relative to each other (e.g., high band to low band interference) may be low enough to allow each antenna to provide a minimum output level of power. Thus, in this manner, the antennas of FIG. 2B may be positioned to allow each to operate in isolation of the other antennas, and may allow all antennas to operate simultaneously when needed.

Thus, a high band antenna HB2 may lie between the two LOS1/LOS2 antennas, and other high band antennas HB1, HB2, and/or HB4 may be placed in positions that are at least a minimum distance apart from each other to prevent interferences. In some cases, the high band antennas may be placed a minimum distance from the LOS1 and/or LOS2 antennas. The low band antennas LB1 and LB2 may be placed close to or immediately next to the HB3 and HB4 antennas. In some examples, additional antennas may be placed between the high band antennas. For instance, a first 5 GHz antenna (5G1) may be placed between HB1 and HB3, along with potentially other antennas including an ultra-high band antenna (UHB). A second 5 GHz antenna (5G2) (or other cellular antenna) may be positioned between HB2 and HB1, as shown in FIG. 2B, along with potentially other antennas including a global navigation satellite system (GNSS) radio.

Each antenna may have minimum operational specifications indicating a minimum amount of power needed to operate. Additionally, or alternatively, some or all of the antennas may specify a minimum amount of 3D spherical radiation coverage needed to operate properly or may specify a maximum amount of radiation coverage that can be provided by that antenna. Still further, some or all of the antennas may have specifications regarding heat dissipation or minimum distances between components for heat regulation. The embodiments herein, including the antennas shown in FIG. 2B for example, may be positioned in a manner that provides enough space between antennas to allow each antenna to operate at least at a minimum power level, provides at least a minimum specified 3D spherical radiation coverage, and/or provides a minimum amount of space for heat dissipation. In some cases, the antennas may be positioned in a manner that allows the antennas to operate at a level higher than the established minimum level or provide 3D spherical radiation coverage that is higher than the minimum level in the antenna's specifications. In such cases, extra distance may be placed between specific antennas so as to avoid interference caused by other signal transmissions when operated at the higher power levels.

FIG. 2C illustrates an embodiment of a mobile electronic device 200C that may be the same as or similar to that of FIG. 2B. In this case, however, in addition to the LOS 1 (202C), LOS2 (203C), HB1-4, LB1-2, and other antennas (e.g., 5G1-2, GNSS, UHB), one, two, or more FR2 antennas may be placed on the support structure 201C of mobile electronic device 200C. In some cases, one of the FR2 antennas may be placed on a topside portion of the mobile electronic device 200C when viewed in landscape mode, while another FR2 antenna may be placed on a bottom-side portion of the mobile electronic device 200C when viewed in landscape mode. One or both of the antennas may be placed on the top portion of the mobile electronic device 200C when viewed in portrait mode. Or, in other cases, one or both of the antennas may be placed in the bottom portion of the mobile electronic device 200C when viewed in portrait mode. In this topside and/or bottom-side position, the FR2 antennas may avoid interfering with other antennas, while providing additional antenna coverage for the mobile electronic device 200C.

The mobile electronic device 200C of FIG. 2C may also include other components including cameras 211C and 214C, a depth sensor 212C, and/or a privacy indicator 213C that surround LOS1 (202C). Still further, the mobile electronic device 200C may include a universal serial bus (USB) port 209C (or some other type of communications port) between LB1 and LB2. In some cases, this USB port 209C may be grounded, which may provide increased isolation for each of the low band antennas. Additionally or alternatively, the mobile electronic device 200C may include a magnetometer 215C, an IMU 207C, and/or an altimeter 208C. Each of these sensors or components may be placed far enough from other antennas to avoid absorbing the antennas' energy and to avoid reducing the antennas' volume. This separation between components may allow each antenna to operate substantially without interference from other antennas or other electronic components. Moreover, this separation allows each antenna to generate radiation coverage according to its specifications, even when working simultaneously with the other antennas and components.

Figure 3:
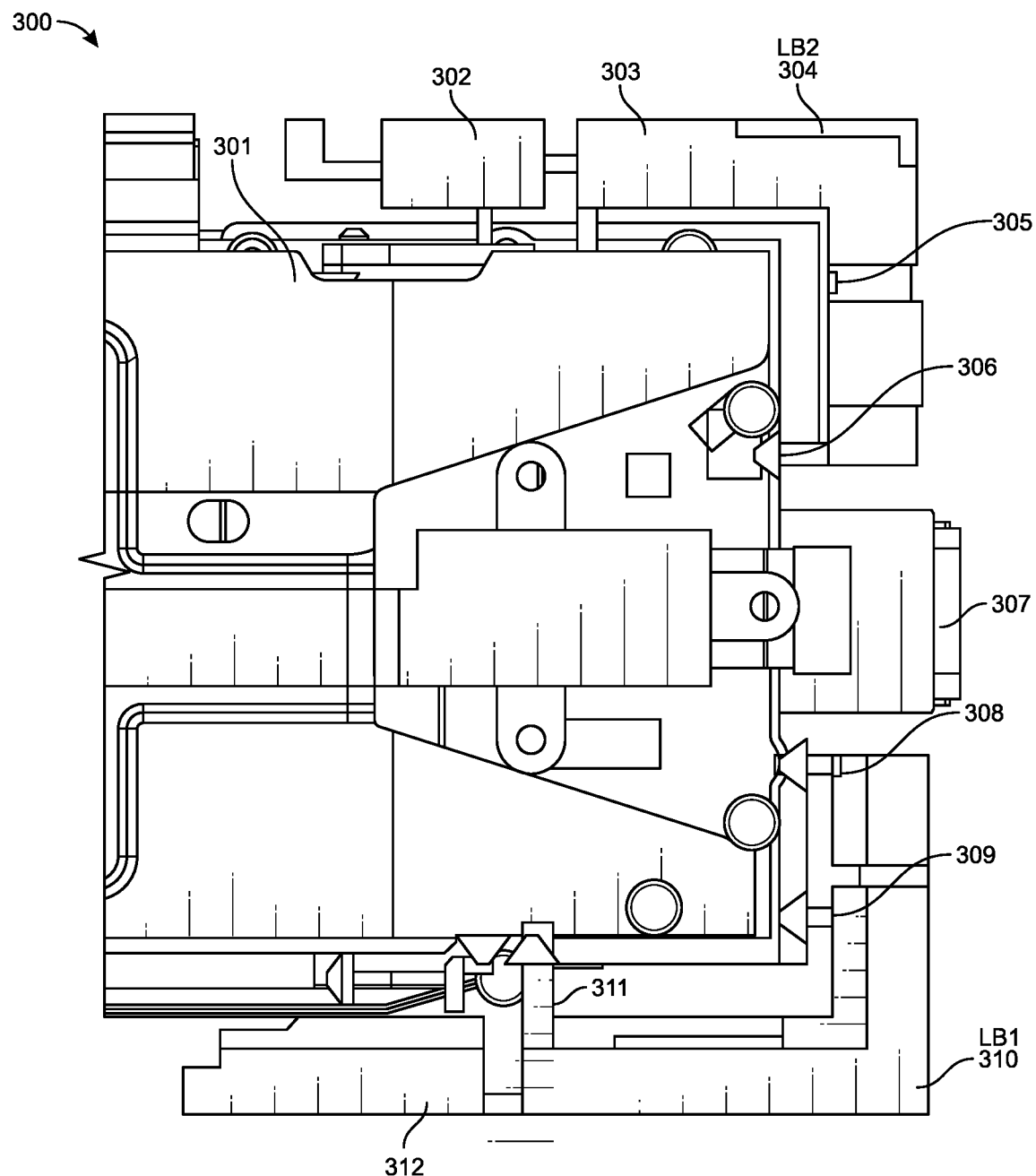
FIG. 3 illustrates an embodiment of a mobile electronic device having various antennas, tuners, and terminations.

FIG. 3 illustrates an embodiment 300 of a mobile electronic device 301 that may be similar to or the same as the mobile electronic devices of FIGS. 1 and 2 above. The mobile electronic device 301 may include various antennas and components including a high band (HB4) antenna 302, a low band (LB2) antenna 304, a tuner 303 for the LB2 antenna, an antenna feed 305 for the LB2 antenna, and an inductor termination 306 for the LB2 antenna. In some cases, the mobile electronic device 301 may include a communications port 307 such as a universal serial bus (USB) port that separates the LB2 antenna 304 from the LB1 antenna 310. The LB1 antenna 310 may include an antenna feed 309, a tuner 311, and an inductor termination 308. Still further, the mobile electronic device 301 may include a middle-high band antenna (MHB3) 312, among potentially other antennas as shown in FIG. 2C. In some cases, these antennas of various types may be inclined to interfere with each other, leading to potential reductions in antenna efficiency.

Indeed, in mobile electronic devices that have small form factors (e.g., smaller than a standard smartphone) and implement multiple antennas, physical constraints may limit antenna efficiency. In embodiments that use low band (e.g., cellular) antennas with a frequency range between 617-960 MHz, the small form factor devices may have a ground plane that limits peak antenna efficiency. Because the ground plane size may limit the efficiency of these low band antennas, the placement of these low band antennas within the mobile device may be limited. Moreover, even when placed in an optimal location within the mobile device, the low band antennas may still need to incorporate one or more tuners to cover a full frequency range (e.g., 617-960 MHz). Such tuners may include aperture tuners, impedance tuners, or other types of tuners.

In at least some of the embodiments described herein, aperture tuners may be implemented to shift the frequency response of the associated antenna by activating switches that are connected to specific locations on the associated antenna. These switches may be terminated with inductors or other electronic components. The systems described herein may select a proper tuner and then select an optimal location for that tuner relative to the antenna that is to be tuned. By selecting the appropriate tuner type and identifying the proper location on the antenna to connect the tuner, the systems herein may be designed to meet specific antenna specifications. These antenna specifications may include a minimum amount of radiated power and/or a minimum amount of antenna efficiency.

In some cases, the antenna topology for the antenna may include an antenna matching network. The antenna matching network may include multiple different electronic components including impedance tuners, terminations, and other components used during operation of the antenna. In some cases, impedance tuners may be implemented in or added to the matching network of the antenna to dynamically change the amount of power delivered to and/or radiated by the antenna. For instance, in some cases, portions of the antenna's power may be absorbed by a user's hand or by the user's body. In such cases, the impedance tuners may modify the antenna matching network to deliver more or less power to the antenna. As such, in different use cases (e.g., where radiated power is being absorbed), the impedance tuners of the antenna matching network may increase or decrease the amount of power delivered to the antenna as needed to overcome internal or external power losses.

In some embodiments, as will be discussed below, inductor terminations may be implemented as part of the antenna matching network. In some instances, inductors that are connected to aperture tuners (e.g., 303 or 311 of FIG. 3) may cause resonances in nearby antennas (e.g., MHB3 or HB4 (312 and 302, respectively)) or other components. These resonances may degrade the operation of the antenna, leading to reduced antenna efficiency. The embodiments herein may provide various components (e.g., configurable shunt switches) to alter, reduce, or remove these resonances. This may allow the antennas to operate with an even greater efficiency.

Figure 4:
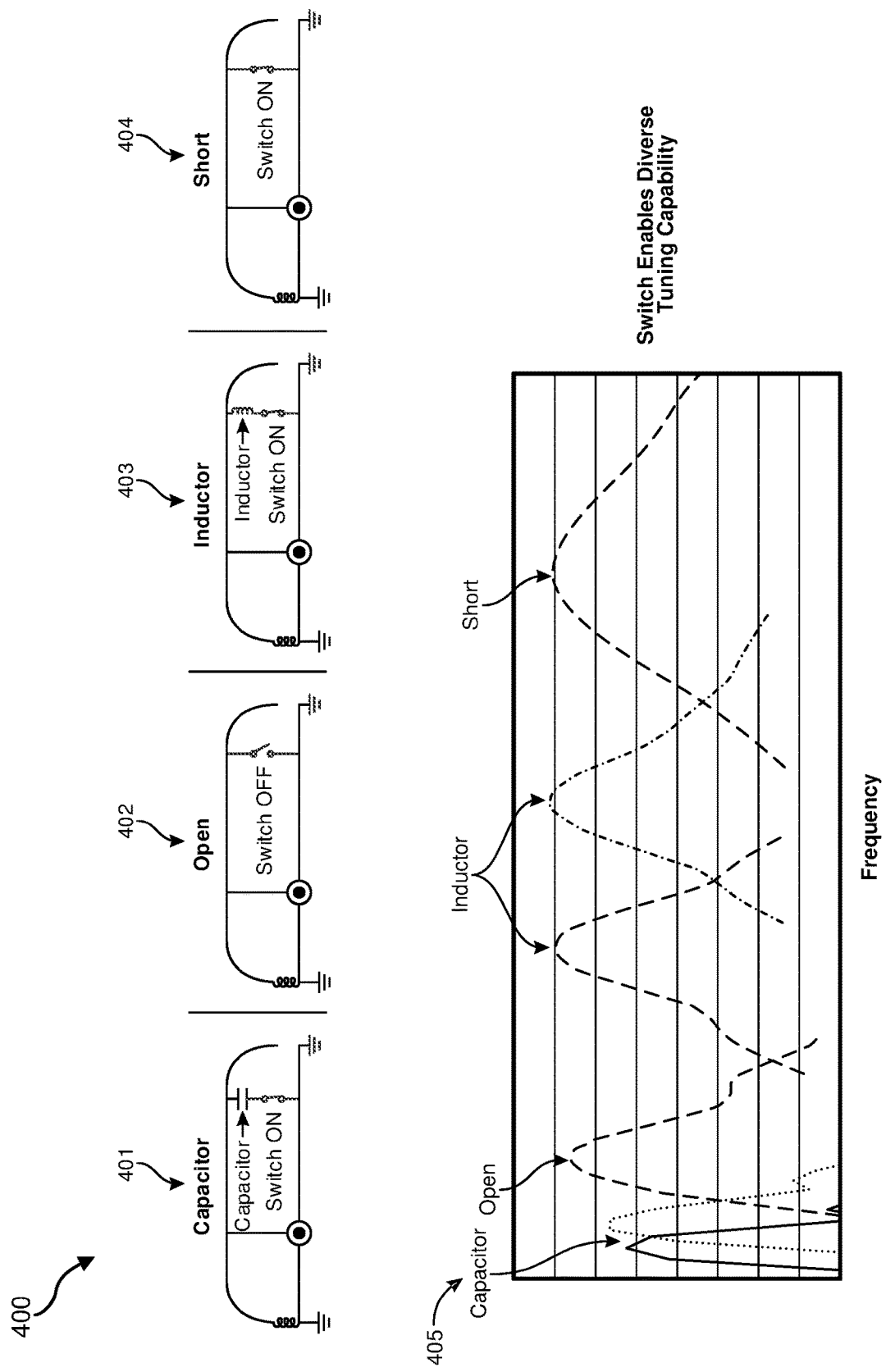
FIG. 4 illustrates embodiments of different types of antenna terminations.

Embodiment 400 of FIG. 4 illustrates terminations for aperture tuners. These aperture tuner terminations may include switches in series with a capacitor (401) or with an inductor (403), or switches that are in an open state (402) when the switch is off, or are in a short state (404) when the switch is on. Each of these aperture terminations may result in resonances in nearby components including antennas. As can be seen on chart 405, the x-axis may represent frequencies from low to high, while the y-axis may represent signal amplitude. In at least some of the embodiments herein, the tuner open state 402 termination may be implemented. In such embodiments, the natural resonance for the tuner in the open state may be at a low band frequency. Then, inductor terminations may be used to tune the frequency response higher to obtain optimum antenna efficiency. In this manner, an inductor termination (e.g., 306 or 308) may be implemented to move the natural resonance to a low band frequency using an open state tuner.

Figure 5:
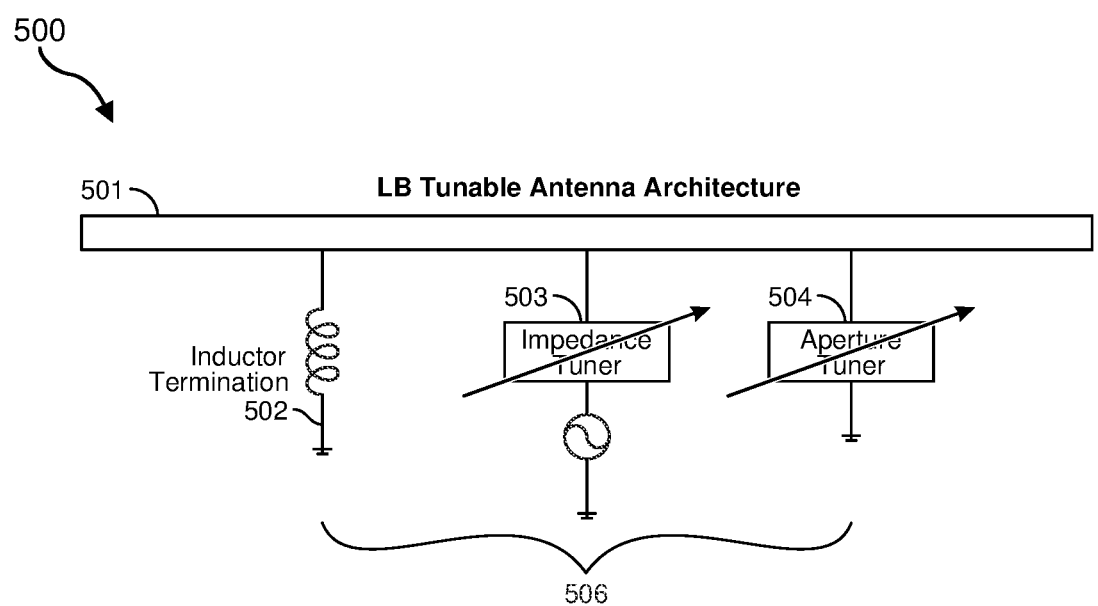
FIG. 5 illustrates an embodiment of a tunable antenna architecture.

In one embodiment, a system may be provided that includes a tunable antenna architecture. For example, FIG. 5 illustrates a low band tunable antenna architecture 500.

The antenna architecture may include an antenna 501 and an antenna matching network 506. The antenna matching network 506 may include an aperture tuner 504 that may be configured to shift the frequency response of the antenna to higher or lower frequencies. The antenna matching network 506 may also include an impedance tuner 503 that may be configured to dynamically change the amount of radiated power for the antenna to higher or lower levels of radiated power. The antenna matching network 506 may also include an inductor termination. In some cases, for instance, the aperture tuner 504 may include a switch that is terminated with an inductor (e.g., 502). In such embodiments, the inductor 502 may be electrically connected to a location on the antenna 501 that allows the antenna to operate at a specified level of radiated power. In some cases, that level of power may be at least a minimum level of radiated power needed by the antenna to operate properly.

In some embodiments, the various components of the antenna matching network 506 (e.g., components 502, 503, and 504) may be positioned at different places on the antenna 501. At least in some cases, the impedance tuner 503 may be attached to an antenna feed (e.g., 305 or 309) and, thus, may be fixed. The locations of the inductor termination 502 and/or the aperture tuner 504, however, may be placed at different locations on the antenna 501. The placement of the components 502 and/or 504 may affect various operating characteristics of the antenna. In some cases, the locations of the inductor termination 502 and/or the aperture tuner 504 may be optimized to allow the antenna to operate at peak efficiency, while avoiding the creation of resonances in other nearby antennas (e.g., the MHB or HB antennas of FIG. 2C). Different antennas may require more or less power, or may have a higher or lower impedance value, or may operate at a higher or lower frequency, may be made of different types of materials (e.g., conductive metal such as copper or a transparent conductive mesh). Alternatively, the antennas may have other operating characteristics. As such, the placement of the tuners and/or terminations on the antenna, may be determined according to one or more desired operating characteristics of the antenna 501.

For instance, in one example, the aperture tuner 504 of the antenna matching network 500 may have specified off-state capacitance (Coff) as one of its operating characteristics. The Coff may indicate the amount of capacitance exhibited by the aperture tuner 504 (or by an associated termination) when the aperture tuner is switched off. This off-state capacitance value may cause resonances in other components or may lead to antenna efficiency drop-offs. As such, in at least some cases, the antenna matching network 500 may be designed such that the off-state capacitance may be below a specified maximum amount of allowable off-state capacitance in the aperture tuner. Alternatively, the aperture tuner 504 may be positioned based on voltage values of the antenna 501 at different positions on the antenna. As can be seen in FIG. 5, the antenna 501 includes many different places where the aperture tuner 504 could be placed. In some cases, the voltages on the antenna may differ depending on where the aperture tuner 504 is placed on the antenna 501. Thus, a placement may be determined that ensures that the aperture tuner 504 is positioned on the antenna 501 at a point where the voltage value is at or below a specified maximum allowable voltage value.

Another operating characteristic that may be considered when determining where to place the aperture tuner 504 on the antenna 501 may be an on-state resistance (Ron) value. The Ron value may indicate the amount of resistance experienced by the switches (e.g., 401-404) that are connected to terminations. This on-state resistance value may lead to antenna efficiency degradation, especially for switches in the "on" states (e.g., 401, 403, or 404 of FIG. 4). Accordingly, at least in some cases, the antenna matching network 500 of FIG. 5 may be designed and/or manufactured such that the on-state resistance of the matching network is below a specified maximum amount of resistance to allow the antenna to operate at a minimum level of efficiency.

Figure 6:
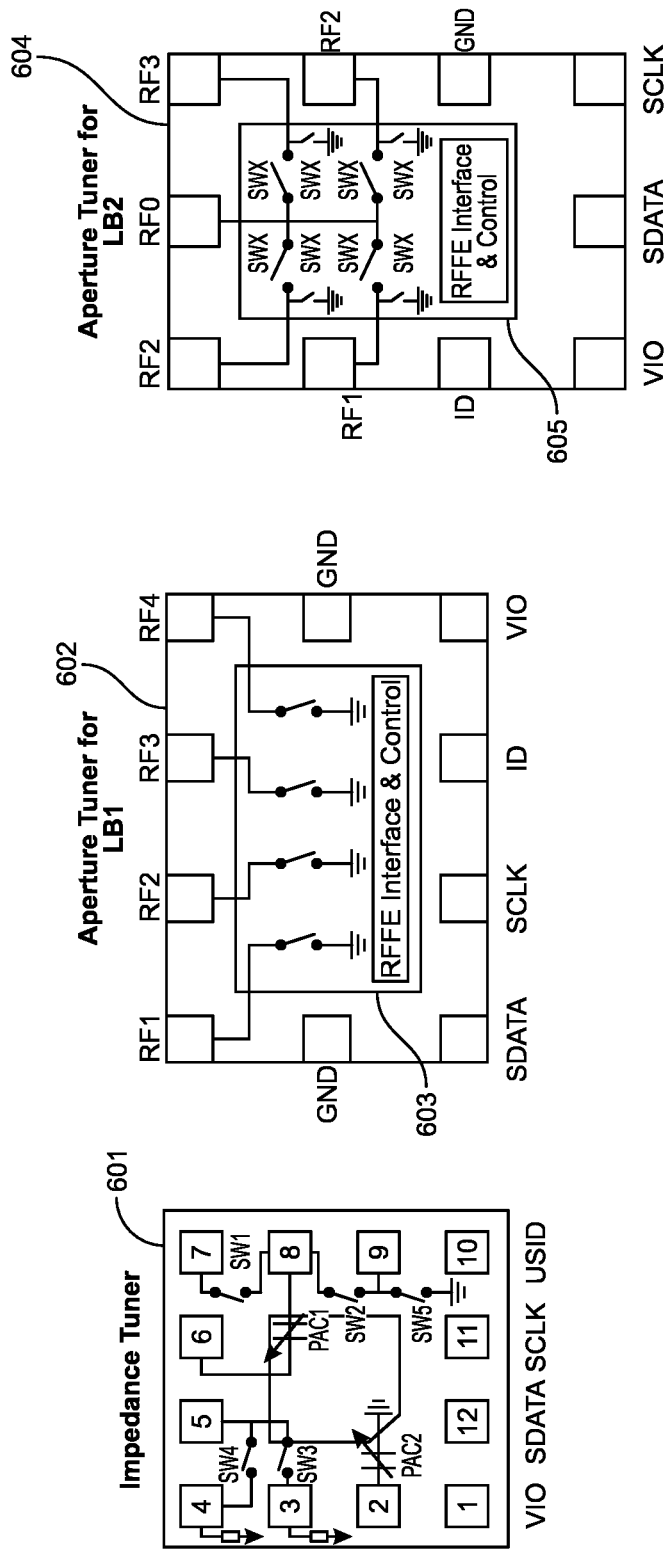
FIG. 6 illustrates embodiments of example impedance and aperture tuners.

In some embodiments, as shown in FIG. 6, an impedance tuner 601 may be implemented that includes a plurality of switches and terminations (similar to or the same as 401-404 of FIG. 4). Different aperture tuners may be used for LB1 and LB2 antennas (e.g., 310 and 304 from FIG. 3), including tuners 602 and 604. Each of these tuners may include multiple switches and terminations, along with interface and control modules 603 and 605, respectively. These interface and control modules 603/605 may allow the electronic devices that implement these tuners to modify one or more operating characteristics of the tuners including tuning the antennas to operate at different frequencies.

Figure 7A:
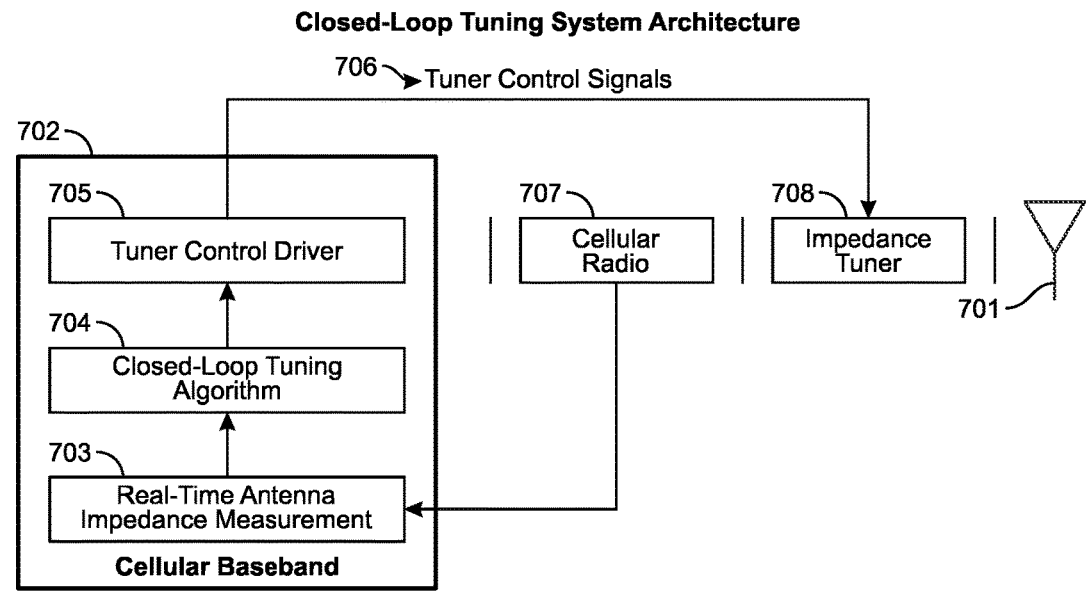
FIGS. 7A-7C illustrate embodiments of a closed-loop tuning system architecture and representative efficiency charts.

Impedance tuners, such as 601 of FIG. 6, may be chosen for specific applications and for implementation in specific devices. For instance, FIG. 7A illustrates an embodiment illustrating how an impedance tuner 708 may be used to tune an antenna for specific scenarios. As noted above, an impedance tuner may be implemented in an antenna matching network to dynamically change the antenna's radiated power. In some cases, the radiated power may be dynamically changed to allow a wearable electronic device to operate more efficiently when being held by a user's hand, for example. In such cases, the user's hand may absorb at least some of the antenna's radiated power and may also detune the antenna. Accordingly, the impedance tuner 708 may be implemented to dynamically increase or decrease the amount of power delivered to the antenna.

Figure 7B:
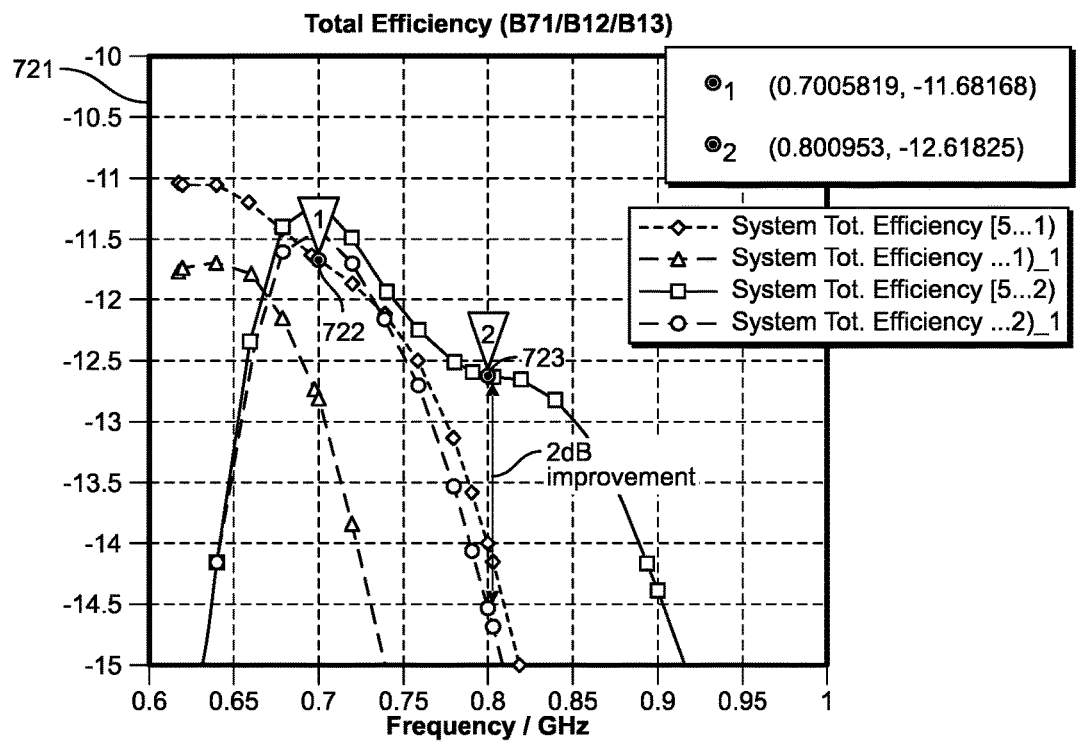
Figure 7C:
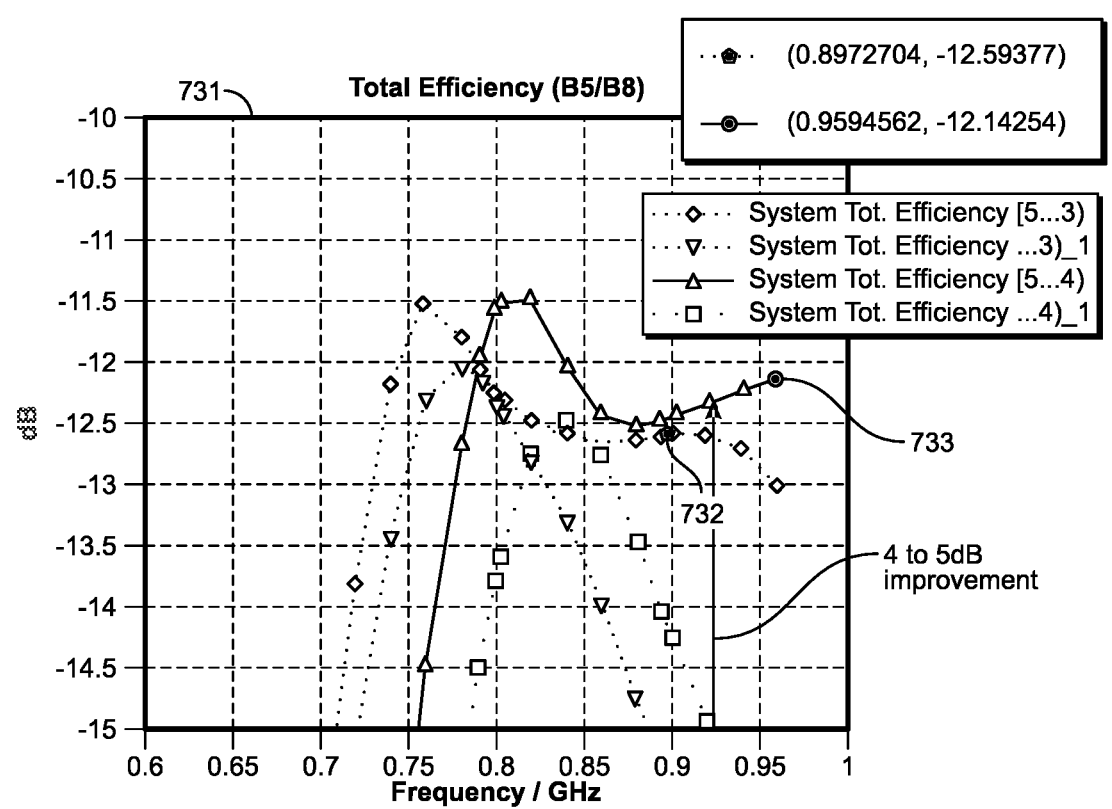

The process 700 of FIG. 7A of modulating the amount of power radiated by the antenna 701 may include determining, for a cellular baseband signal 702, a real-time antenna impedance measurement 703 based on a sampled signal from a cellular radio 707. The process 700 may then implement a closed-loop tuning algorithm 704 using a tuner control driver 705 to send tuner control signals 706 to the impedance tuner 708. These tuner control signals 706 may control the impedance tuner 708 to allow more power to the antenna 701 by changing the matching circuit and the amount of power delivered to the antenna (e.g., to counteract the absorption caused by the user's hand). Thus, the process 700 for modulating antenna radiated power in the antenna 701 may regulate up or down as needed to allow use of the wearable device in different scenarios. Charts 721 of FIG. 7B and 731 of FIG. 7C illustrate improvements that may result from this closed-loop impedance tuning, including a 2 dB improvement in total efficiency over specified frequency bands 722 and 723, as shown in chart 721, and a 4-5 dB improvement in total antenna efficiency over different frequency bands 732 and 733, as shown in chart 731.

In some embodiments, a wearable electronic device may be provided. The wearable electronic device may be a wireless electronic device such as 100 of FIG. 1 or 200 of FIG. 2A. Alternatively, the wearable electronic device may be a virtual reality headset, a pair of augmented reality glasses, a smartwatch, a smartphone, or similar device. In other cases, the electronic device may not be wearable, but may implement antennas for wireless transmission or reception including laptops, tablets, internet of things (IoT) devices, or other electronic devices. The (wearable) electronic device may include a support structure (e.g., made of plastic, metal, or other materials) that provides support and protection for electronic and/or mechanical components.

In some embodiments, for instance, one or more different antennas may be mounted to at least some part of the support structure. In some cases, the components may be mounted to a printed circuit board that is, itself, mounted to the support structure. The electronic device may also include an antenna matching network that has an aperture tuner configured to shift a frequency response of the antenna and an impedance tuner configured to dynamically change an amount of radiated power for the antenna. In such embodiments, the antenna matching network may be positioned away from the antenna. The distance between the antenna and the antenna matching network may be at least a specified minimum distance based on various operating characteristics of the antenna.

The antenna may be substantially any type of antenna, including a monopole antenna, a dipole, a slot, a loop, or other type of antenna. Moreover, the antenna(s) may be designed to operate in different ranges including low band, high band, ultrawideband, or other frequencies, as identified above. In some embodiments, the wearable electronic device may include one or more low band antennas. Additionally or alternatively, the wearable electronic device may include a medium band antenna and a high band antenna, along with an aperture tuner and/or an impedance tuner in its antenna matching network. In such cases, the aperture tuner may be placed at a position (relative to the antenna) that reduces coupling between the aperture tuner and the medium band antenna or the high band antenna.

This design may reduce the coupling to a level that is below a specified maximum amount. For example, if a given design shows potential degradation of 4 dB due to coupling between low band and medium or high band antennas, the embodiments herein may place the aperture tuner at a position on the antenna that reduces antenna operating efficiency to only 3 dB degradation, or to only 2 dB or 1 dB degradation. The placement on the antenna may be tested and measured to ensure that coupling between the antennas is below a maximum allowable amount.

Figure 8A:
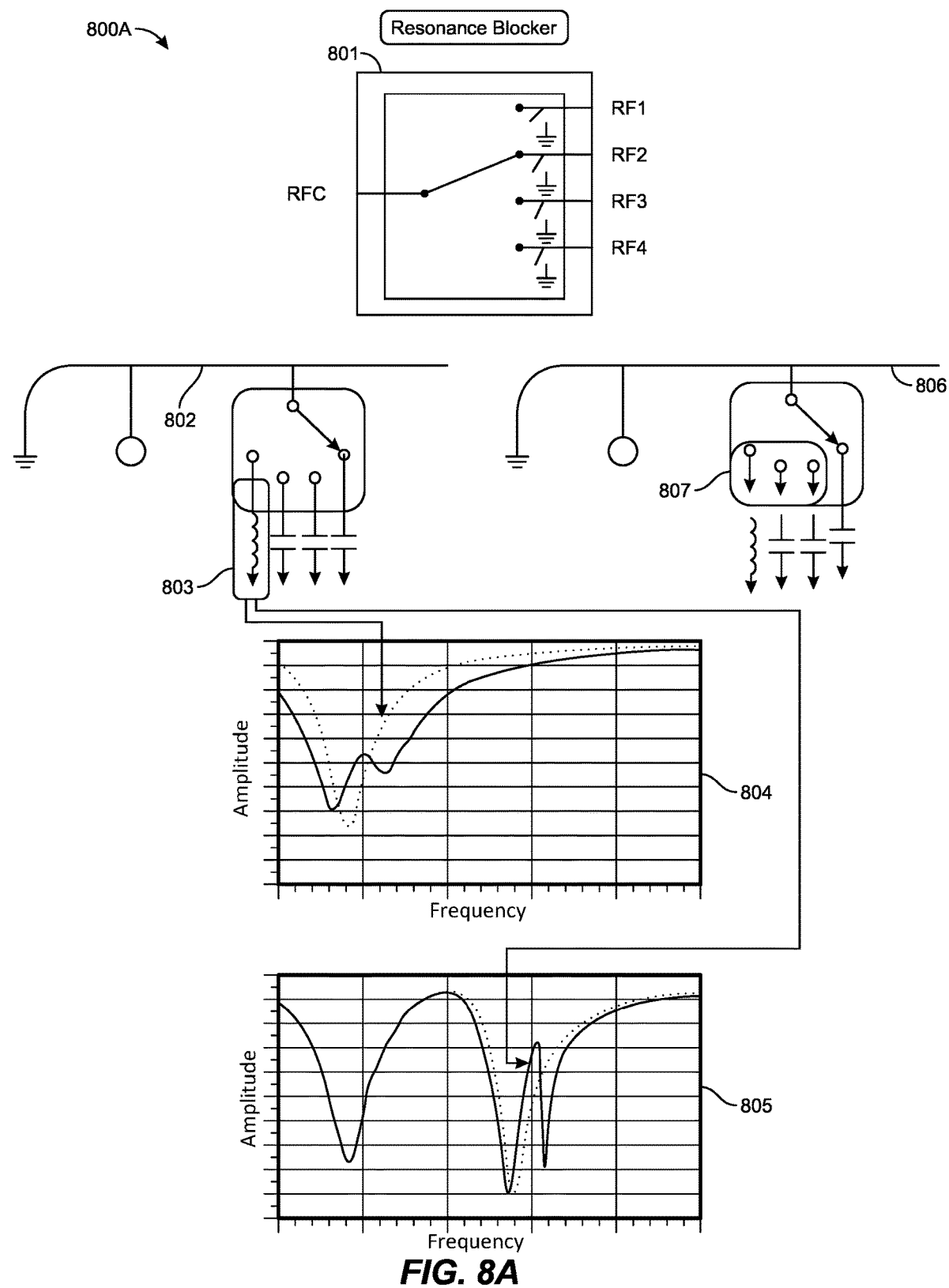
FIGS. 8A and 8B illustrate embodiments of a resonance blocker architecture for aperture tuners.
Figure 8B:
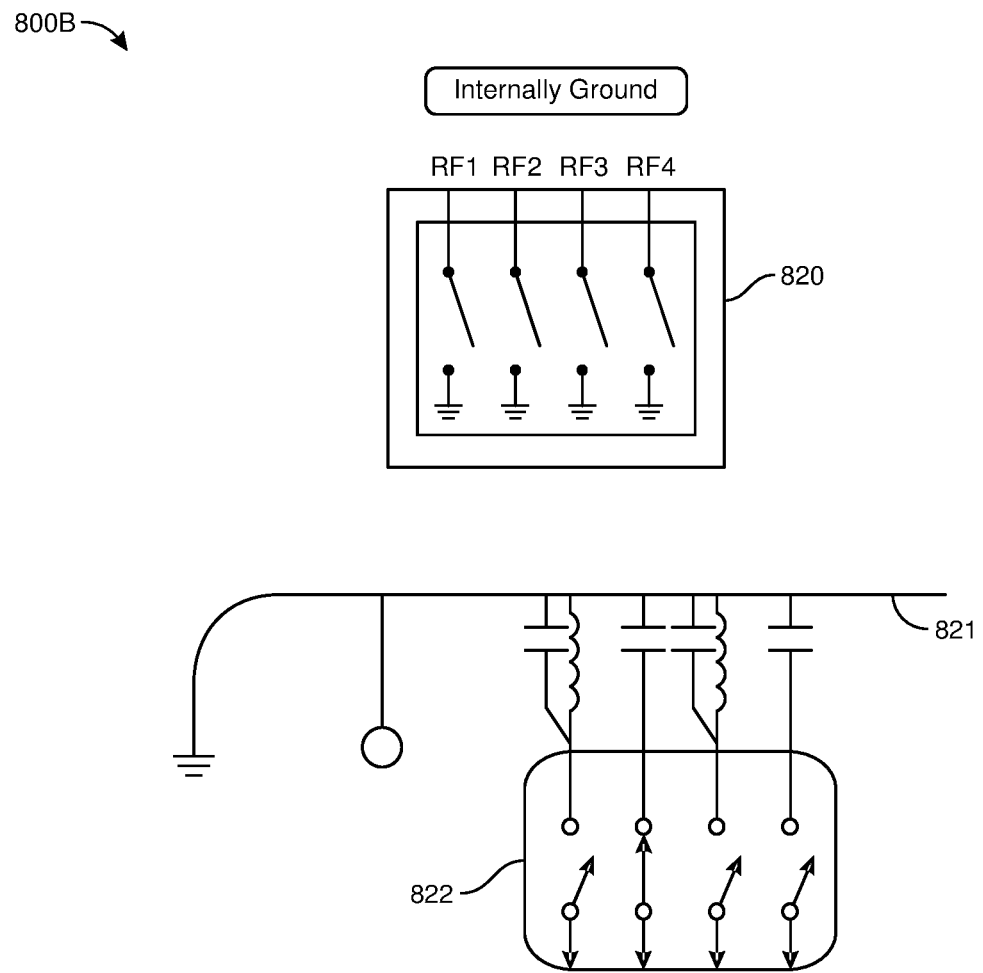

In some cases, as shown in embodiment 800A of FIG. 8A, a wearable electronic device (or, more specifically, its antenna matching network) may include one or more resonance blockers 801 that short inactive inductors in the matching network. For example, in some cases, configurable shunt switches shown in 802 and 806 may be implemented to reduce or eliminate undesired resonances that may be caused by tuning elements. For instance, the resonances of circuit 802 may be shown in charts 804 and 805. In chart 804, resonances caused by the off-state capacitance of switch 803, for example, may be eliminated or reduced by connecting a shunt switch 807 to ground, resulting in an updated chart 805 that shows an elimination of the noted resonance. In some cases, as noted in embodiment 800B of FIG. 8B, an aperture tuner without a resonance blocker (e.g., 820) may include a set of switches that is internally connected to ground. This type of aperture tuner without resonance blocker may improve antenna performance by reducing parasitic capacitance due to the absence of electrostatic discharge (ESD) shunt switches. Moreover, the terminations in 821 may be designed not to introduce resonances in nearby antennas. The aperture tuner 820 may thus provide a simplified switch that may lose less energy to parasitic capacitance and may, thus, be more efficient in low frequency antenna states.

In some embodiments, the wearable electronic device may include capacitors (822) that are part of or are electrically connected to the aperture tuner without resonance blocker 820. In such cases, the capacitors may be configured to tune resonances of the inactive inductors. The wearable electronic device may determine that an alternative antenna matching network topology is to be used. In such cases, the impedance tuner of the wearable electronic device may switch, in response to an input signal, to a different specified matching network topology (e.g., a topology with different antenna terminations).

Figure 9:
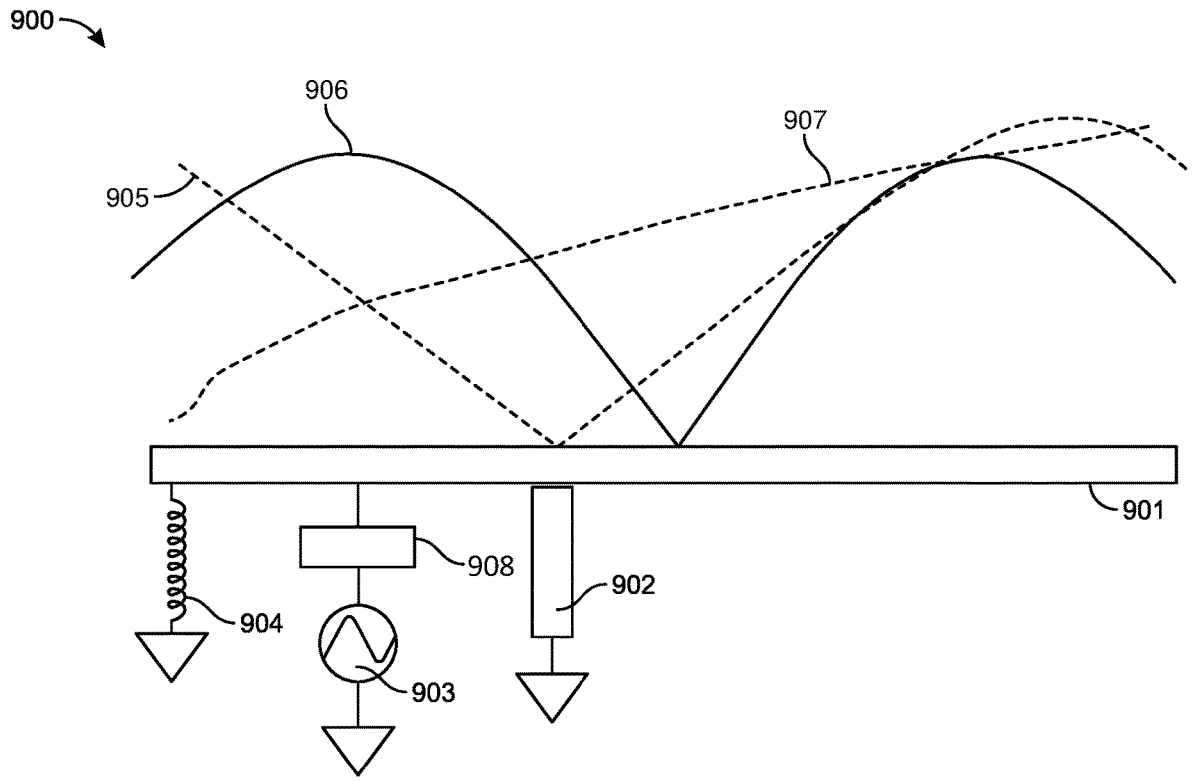
FIG. 9 illustrates an embodiment of a voltage distribution for a tuner showing first, second, and third resonances.

FIG. 9 illustrates an embodiment 900 of an antenna 901 with a matching network 908. The antenna may include an aperture tuner 902, an antenna feed 903, and a termination 904 (e.g., an inductor termination). In this embodiment, the antenna may cause resonances including first resonance 907, second resonance 905, and third resonance 906. In some cases, the first resonance 907 of the antenna may occur in an open state with an open circuit tuner load (e.g., 402 of FIG. 4). In such cases, the switch terminated with the inductor may be implemented to tune the open state antenna matching network. In this embodiment, the resonances may occur according to a voltage distribution (e.g., 907) that represents how voltage is distributed across the antenna 901.

Figure 10:
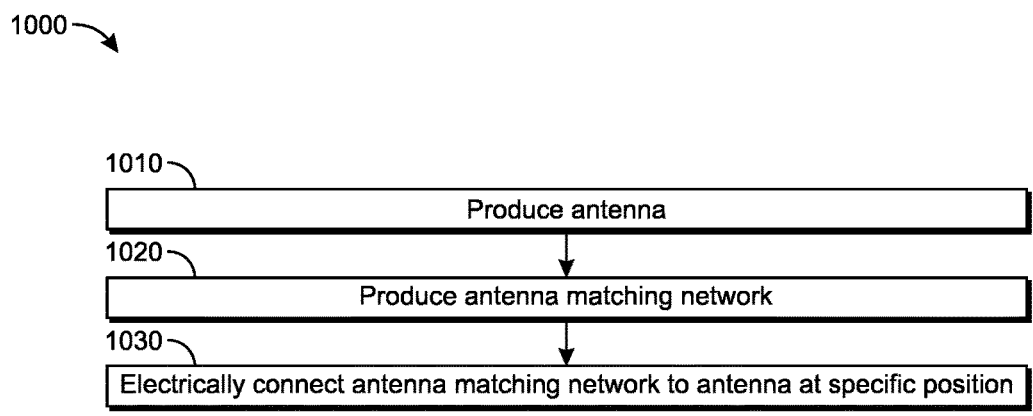
FIG. 10 is a flow diagram of an exemplary method for manufacturing an antenna tuning structure.

FIG. 10 is a flow diagram of an exemplary method for manufacturing an antenna tuner topology and/or a wearable electronic device that implements such an antenna tuner topology. The steps shown in FIG. 10 may be performed by any suitable manufacturing equipment that may be controlled according to computer-executable code executed by a computing system.

For example, method 1000 may include various steps for manufacturing an antenna tuning architecture including, at step 1010, producing an antenna and, at step 1020, producing an antenna matching network. The antenna matching network may have at least one aperture tuner configured to shift a frequency response of the antenna and at least one impedance tuner configured to dynamically change an amount of radiated power for the antenna. In some cases, the antenna matching network may be positioned at least a specified minimum distance from the antenna according to various operating characteristics of the antenna including operating frequency, impedance value, total radiated power, antenna efficiency level, resulting resonances, or other operating characteristics.

In some cases, the method 1000 may also include steps for producing a support structure and assembling the antenna and the antenna matching network within the support structure. In such cases, the support structure may be part of a watch body of a smart watch, or may be part of the body of a mobile electronic device such as that illustrated in FIGS. 1 and 2A above. In this manner, the embodiments herein may produce, manufacture, or otherwise provide antennas with corresponding antenna matching networks, either in isolation or as part of a mobile electronic device.

EXAMPLE EMBODIMENTS

Example 1: A system may include an antenna and an antenna matching network that may include at least one aperture tuner configured to shift a frequency response of the antenna, and at least one impedance tuner configured to dynamically change an amount of radiated power for the antenna, wherein the antenna matching network is positioned at least a specified minimum distance from the antenna according to one or more operating characteristics of the antenna.

Example 2: The system of Example 1, wherein the aperture tuner includes at least one switch terminated with at least one inductor.

Example 3: The system of Examples 1 or 2, wherein the at least one inductor is electrically connected to a location on the antenna that allows the antenna to operate at at least a minimum level of radiated power.

Example 4: The system of any of Examples 1-3, wherein a first resonance of the antenna matching network occurs in an open state with an open circuit tuner load.

Example 5: The system of any of Examples 1-4, wherein the switch terminated with the inductor is implemented to tune the open state antenna matching network.

Example 6: The system of any of Examples 1-5, wherein the aperture tuner of the antenna matching network includes one or more operating characteristics including a specified off-state capacitance (Coff).

Example 7: The system of any of Examples 1-6, wherein the off-state capacitance is below a specified maximum amount of capacitance.

Example 8: The system of any of Examples 1-7, wherein the aperture tuner is positioned according to voltage values of the antenna at different positions on the antenna.

Example 9: The system of any of Examples 1-8, wherein the aperture tuner is positioned on the antenna at a point where the voltage value is below a specified maximum voltage value.

Example 10: The system of any of Examples 1-9, wherein the aperture tuner of the antenna matching network includes one or more operating characteristics including a specified on-state resistance (Ron).

Example 11: The system of any of Examples 1-10, wherein the on-state resistance is below a specified maximum amount of resistance.

Example 12: A wearable electronic device may include a support structure, an antenna mounted to at least a portion of the support structure, and an antenna matching network that may include at least one aperture tuner configured to shift a frequency response of the antenna and at least one impedance tuner configured to dynamically change an amount of radiated power for the antenna, wherein the antenna matching network is positioned at least a specified minimum distance from the antenna according to one or more operating characteristics of the antenna.

Example 13: The wearable electronic device of Example 12, wherein the antenna comprises a low band antenna.

Example 14: The wearable electronic device of Examples 12 or 13, further comprising at least one of a medium band antenna or a high band antenna.

Example 15: The wearable electronic device of any of Examples 12-14, wherein the aperture tuner is placed at a position that reduces coupling between the aperture tuner and the medium band antenna or the high band antenna to an amount that is below a specified maximum amount.

Example 16: The wearable electronic device of any of Examples 12-15, further comprising one or more resonance blockers that short one or more inactive inductors in the antenna matching network.

Example 17: The wearable electronic device of any of Examples 12-16, further comprising one or more capacitors electrically connected to the resonance blockers.

Example 18: The wearable electronic device of any of Examples 12-17, wherein the capacitors electrically connected to the resonance blockers are configured to tune one or more resonances of the inactive inductors.

Example 19: The wearable electronic device of any of Examples 12-18, wherein the impedance tuner, in response to an input signal, switches to a different specified matching network topology.

Example 20: A method of manufacturing an antenna tuning structure may include producing an antenna and producing an antenna matching network including: at least one aperture tuner configured to shift a frequency response of the antenna and at least one impedance tuner configured to dynamically change an amount of radiated power for the antenna, wherein the antenna matching network is positioned at least a specified minimum distance from the antenna according to one or more operating characteristics of the antenna.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
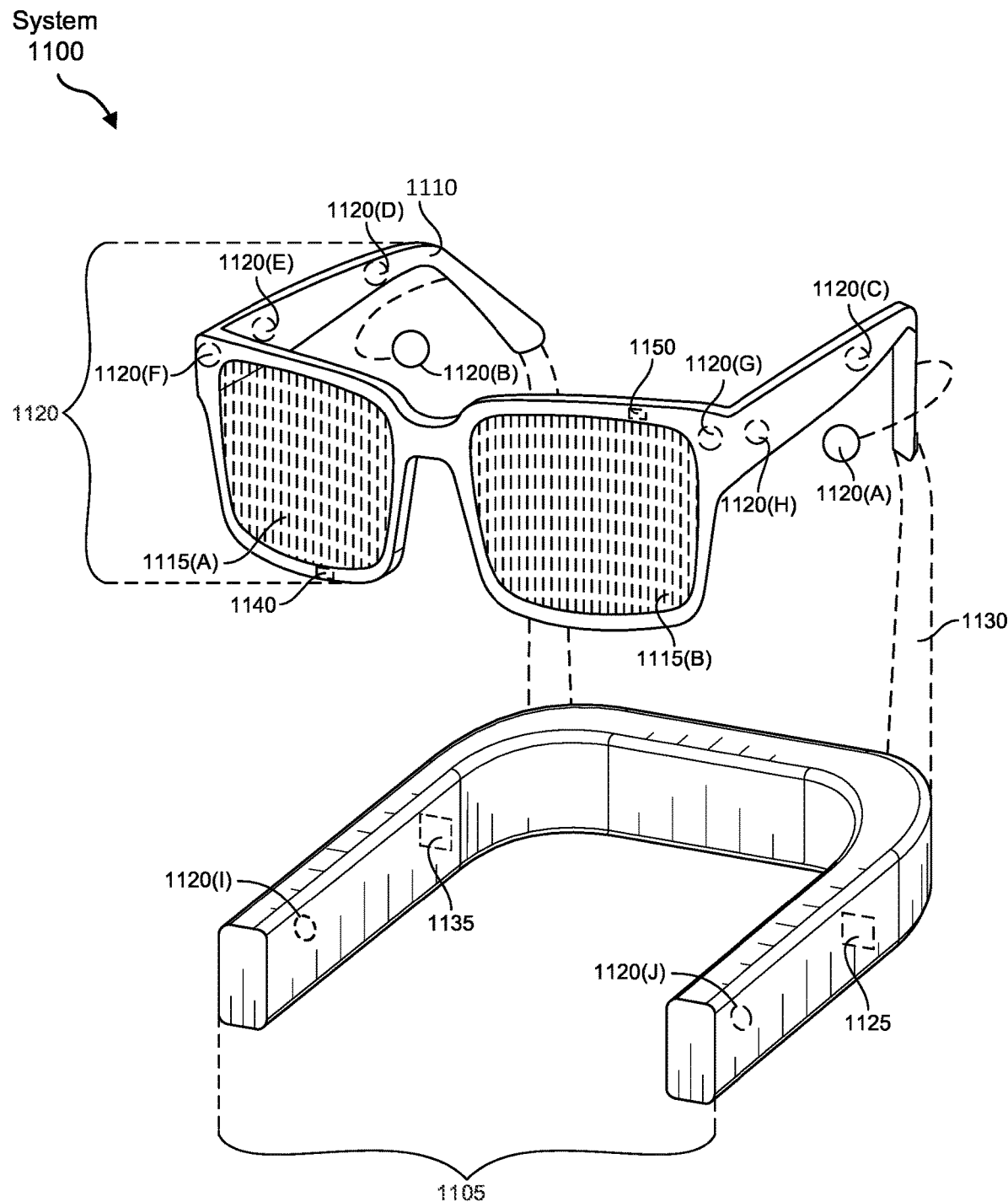
FIG. 11 is an illustration of exemplary augmented-reality glasses that may be used in connection with embodiments of this disclosure.
Figure 12:
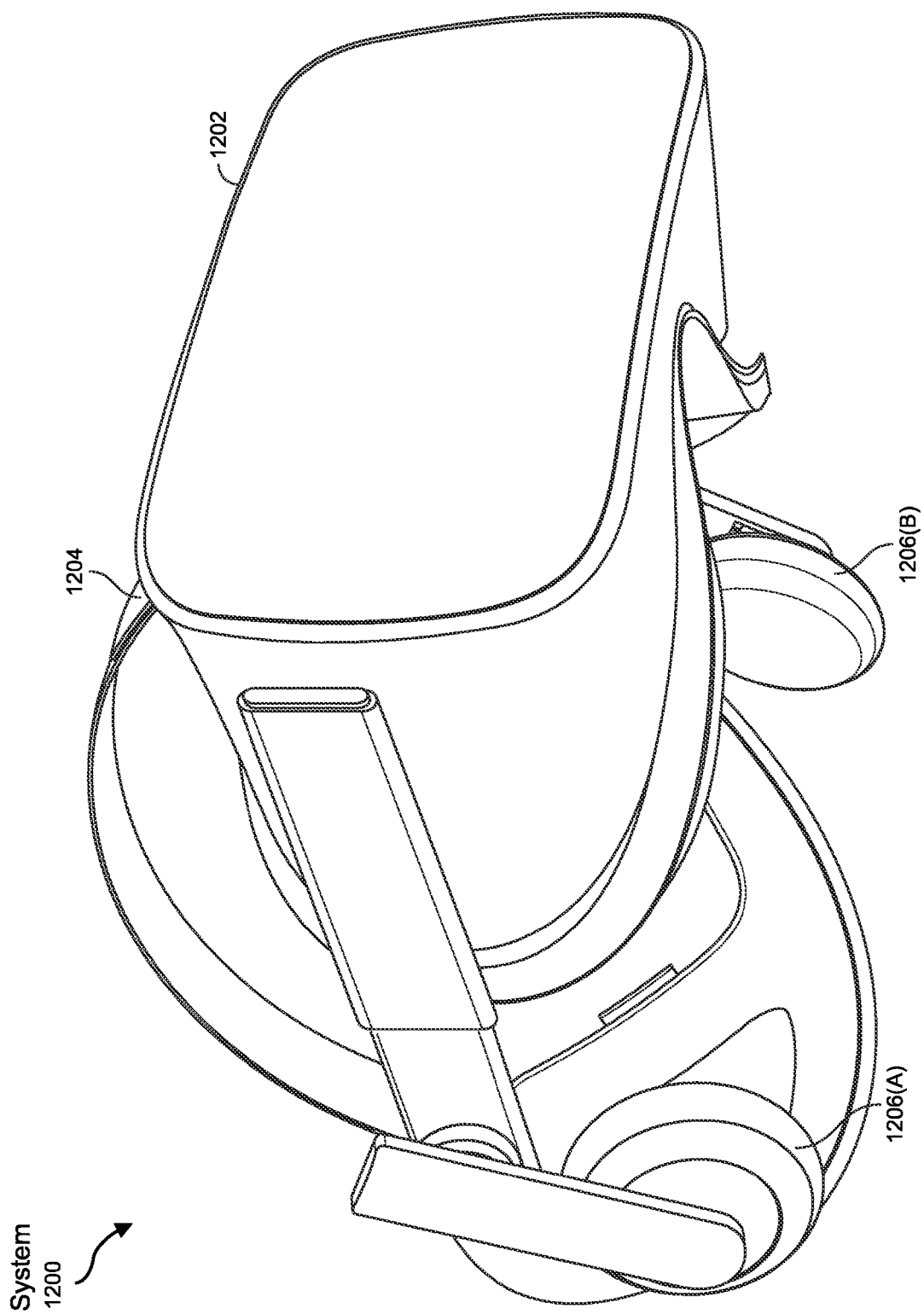
FIG. 12 is an illustration of an exemplary virtual-reality headset that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(1) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality system 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, handheld controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(1) and 1120(J)) that are part of the microphone array (or potentially form their own microphone subarray). Neckband 1105 may also include a controller 1125 and a power source 1135.

Acoustic transducers 1120(1) and 1120(J) of neckband 1105 may be configured to detect sound and convert the detected sound into an electronic format (analog or digital). In the embodiment of FIG. 11, acoustic transducers 1120(1) and 1120(J) may be positioned on neckband 1105, thereby increasing the distance between the neckband acoustic transducers 1120(1) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a processor;
an antenna; and
an antenna matching network including:
at least one aperture tuner configured to shift a frequency response of the antenna; and
at least one impedance tuner configured to dynamically change an amount of radiated power for the antenna,
wherein the antenna matching network is positioned at least a specified minimum distance from the antenna according to one or more operating characteristics of the antenna,
wherein the antenna is configured to provide a line-of-sight intralink connection to a first electronic device at an ultra-high frequency that operates above a minimum specified frequency and allows the processor to share computational load with the first electronic device;
wherein a second antenna of the system is positioned at a minimum offset angle relative to the antenna, allowing the second antenna to operate in conjunction with the antenna while avoiding interference with the line-of-sight intralink.

2. The system of claim 1, wherein the aperture tuner includes at least one switch terminated with at least one inductor.

3. The system of claim 2, wherein the at least one inductor is electrically connected to a location on the antenna that allows the antenna to operate at at least a minimum level of radiated power.

4. The system of claim 2, wherein a first resonance of the antenna matching network occurs in an open state with an open circuit tuner load.

5. The system of claim 4, wherein the switch terminated with the inductor is implemented to tune the open state antenna matching network.

6. The system of claim 1, wherein the aperture tuner of the antenna matching network includes one or more operating characteristics including a specified off-state capacitance (Coff).

7. The system of claim 6, wherein the off-state capacitance is below a specified maximum amount of capacitance.

8. The system of claim 6, wherein the aperture tuner is positioned according to voltage values of the antenna at different positions on the antenna.

9. The system of claim 8, wherein the aperture tuner is positioned on the antenna at a point where the voltage value is below a specified maximum voltage value.

10. The system of claim 1, wherein the aperture tuner of the antenna matching network includes one or more operating characteristics including a specified on-state resistance (Ron).

11. The system of claim 10, wherein the on-state resistance is below a specified maximum amount of resistance.

12. A wearable electronic device comprising:
a processor;
a support structure;
an antenna mounted to at least a portion of the support structure; and
an antenna matching network including:
at least one aperture tuner configured to shift a frequency response of the antenna; and
at least one impedance tuner configured to dynamically change an amount of radiated power for the antenna,
wherein the antenna matching network is positioned at least a specified minimum distance from the antenna according to one or more operating characteristics of the antenna,
wherein the antenna is configured to provide a line-of-sight intralink connection to a first electronic device at an ultra-high frequency that operates above a minimum specified frequency and allows the processor to share computational load with the first electronic device;
wherein a second antenna of the system is positioned at a minimum offset angle relative to the antenna, allowing the second antenna to operate in conjunction with the antenna while avoiding interference with the line-of-sight intralink.

13. The wearable electronic device of claim 12, wherein the antenna comprises a low band antenna.

14. The wearable electronic device of claim 13, further comprising at least one of a medium band antenna or a high band antenna.

15. The wearable electronic device of claim 14, wherein the aperture tuner is placed at a position that reduces coupling between the aperture tuner and the medium band antenna or the high band antenna to an amount that is below a specified maximum amount.

16. The wearable electronic device of claim 14, further comprising one or more resonance blockers that short one or more inactive inductors in the antenna matching network.

17. The wearable electronic device of claim 16, further comprising one or more capacitors electrically connected to the resonance blockers.

18. The wearable electronic device of claim 17, wherein the capacitors electrically connected to the resonance blockers are configured to tune one or more resonances of the inactive inductors.

19. The wearable electronic device of claim 12, wherein the impedance tuner, in response to an input signal, switches to a different specified matching network topology.

20. A method of manufacturing an antenna tuning structure, comprising:
producing a processor;
producing an antenna; and
producing an antenna matching network including:
at least one aperture tuner configured to shift a frequency response of the antenna; and
at least one impedance tuner configured to dynamically change an amount of radiated power for the antenna,
wherein the antenna matching network is positioned at least a specified minimum distance from the antenna according to one or more operating characteristics of the antenna,
wherein the antenna is configured to provide a line-of-sight intralink connection to a first electronic device at an ultra-high frequency that operates above a minimum specified frequency and allows the processor to share computational load with the first electronic device;
wherein a second antenna of the system is positioned at a minimum offset angle relative to the antenna, allowing the second antenna to operate in conjunction with the antenna while avoiding interference with the line-of-sight intralink.

\* \* \* \* \*